Feb. 7, 1950     L. J. SHERRY     2,497,018
FILTER AND SUNSHADE SUPPORT FOR CAMERAS
Filed July 3, 1947     2 Sheets-Sheet 1
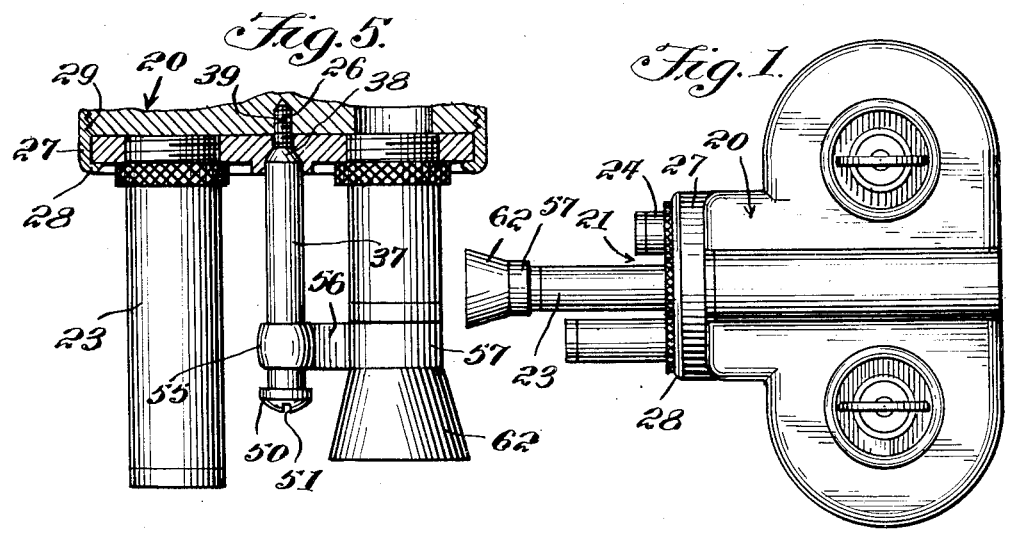
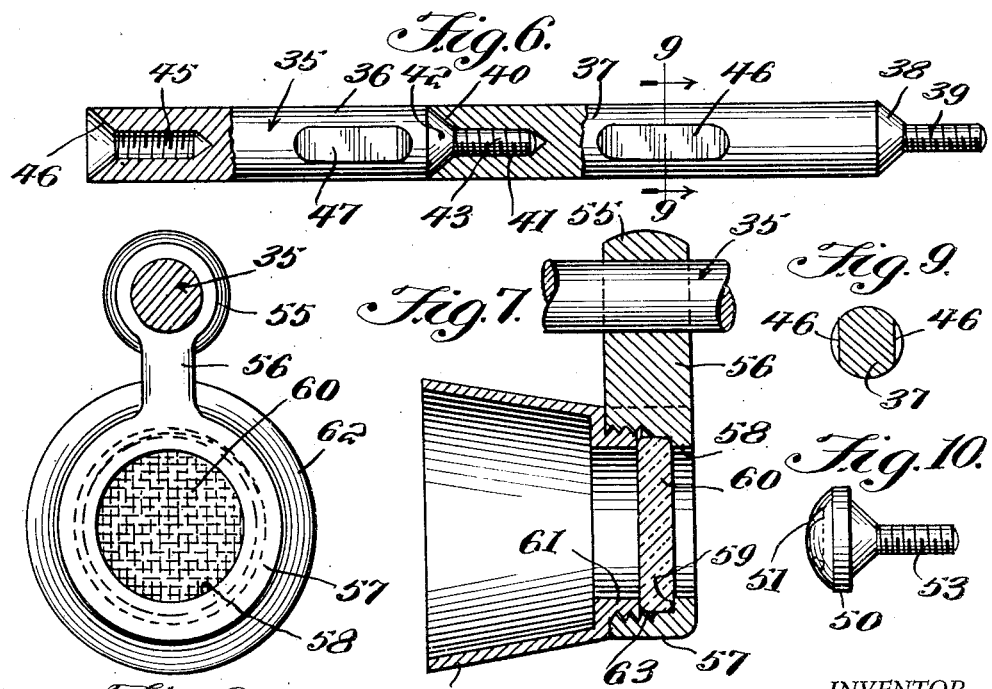
INVENTOR.
Leo J. Sherry,
BY Victor J. Evans & Co.
ATTORNEYS

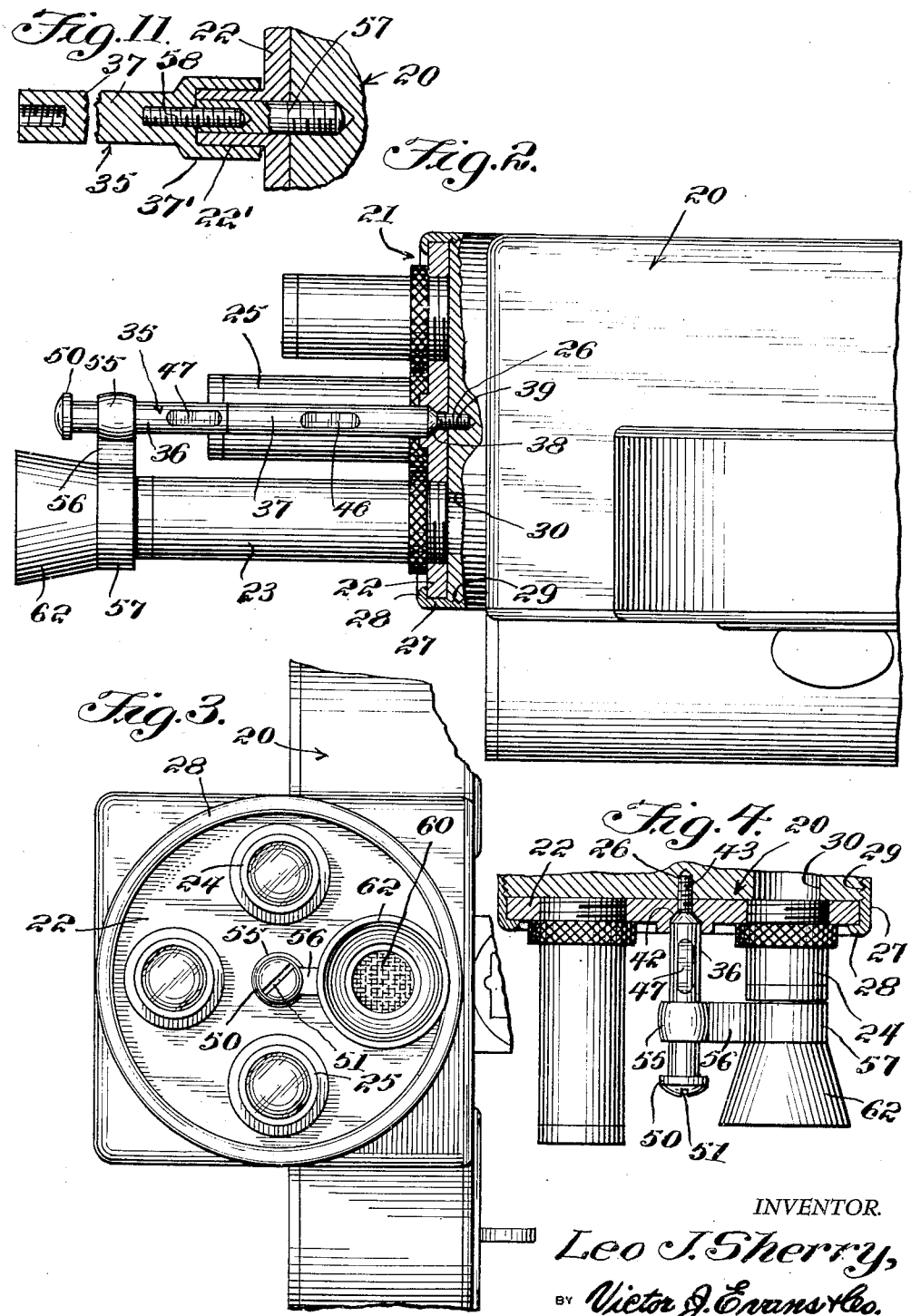

Patented Feb. 7, 1950

2,497,018

UNITED STATES PATENT OFFICE 2,497,018

FILTER AND SUNSHADE SUPPORT
FOR CAMERAS

Leo J. Sherry, West Los Angeles, Calif.

Application July 3, 1947, Serial No. 758,787

6 Claims. (Cl. 88—1)

This invention relates to a filter and sun shade support for cameras, and more particularly to such a device primarily adapted for use with motion picture cameras of the turret head type.

A primary object of this invention is the provision of an improved filter and sun shade support for turret head cameras which may be readily adapted for use with any of the lens systems carried by the turret head.

A further object of the invention is the provision of such a device which may be readily adapted for use with any of such lens assemblies without the necessity of removing the device from the camera.

A more specific object of the invention is the provision of a centrally positioned support for such a filter adapted to be substituted for the holding screw normally associated with a turret head camera.

A further specific object of the invention is the provision of such a device directly mounted on the camera adjacent the turret head, and characterized by means facilitating the ready adjustment of the device to any of the lens assemblies.

A further object of the invention is the provision of such a device which may be readily operated by hand with a minimum of difficulty, time, and effort.

Still another object of the invention is the provision of such a device which is sturdy and durable in construction, reliable and efficient in operation, and relatively simple and inexpensive to manufacture, assemble and utilize, which obviates the necessity of utilizing a separate filter and sun shade for each lens assembly.

Still other objects reside in the combination of elements, arrangement of parts, and features of construction, all as will be more fully pointed out hereinafter and disclosed in the accompanying drawings wherein there is shown a preferred embodiment of this inventive concept.

In the drawings:

Figure 1 is a side elevational view of a motion picture camera including a turret head showing the sun shade and filter of the instant invention as applied thereto.

Figure 2 is a top plan view, on an enlarged scale, of the assembly of Figure 1, certain portions thereof being broken away.

Figure 3 is a front elevational view of the assembly shown in Figure 2, portions thereof being broken away.

Figure 4 is a fragmentary top view partially in elevation and partially in section, similar to Figure 2, but showing the assembly adapted for use with a different lens.

Figure 5 is a view similar to Figure 4 but showing the parts in operative relation with the third lens of a turret head.

Figure 6 is an enlarged view partially in elevation and partially in section showing certain of the elements of the filter supporting assembly.

Figure 7 is an enlarged vertical sectional view taken substantially through the center line of the filter holder and sun shade.

Figure 8 is a front plan view of the construction disclosed in Figure 7.

Figure 9 is a sectional view taken substantially along the line 9—9 of Figure 6 as viewed in the direction indicated by the arrows, and Figure 10 is a side elevational view of the cap screw comprising an element of the assembly.

Figure 11 is a fragmentary and cross-sectional view of a modified form of turret plate and a different means for the attachment of the slide rod thereto.

Similar reference characters refer to similar parts throughout the several views of the drawings.

Referring now to the drawings in detail there is generally indicated at 20 a motion picture camera of any desired conventional type, adapted to be provided with a turret head generally indicated at 21. The turret head includes a mounting plate 22, which carries three lens assemblies, which for the purpose of convenience will be described as a long barrel lens assembly 23, a short barrel lens assembly 24, and an intermediate barrel lens assembly 25. The plate 22 is normally secured to the front of the camera by a turret head holding screw, which is adapted to engage in a centrally positioned threaded aperture 26 in the front of the camera. In the instant invention the above mentioned screw is adapted to be replaced by certain other elements, to be more fully described hereinafter, and is correspondingly not shown.

The turret plate 22 is adapted to be further held for rotation on the camera by means of a peripheral collar 27, including a flange 28 adapted to overlie the rim of the plate, and threaded as at 29 to engage corresponding threads peripherally positioned about the rim of the front of the camera. The mechanism heretofore described has been conventional, and in the operation of the device the plate 22 is suitably rotated until one or the other of the lens barrel assemblies is selectively positioned in alignment with a bore 30 in communication with the operating mechanism of the camera, the arrangement being such that any of the lens barrel assemblies optionally may be selected for use in the use of the camera, with a comparative minimum of time, effort and difficulty.

As conducive to a clearer understanding of this invention it should be pointed out that in the use of such cameras it is frequently necessary to use a filter, as well as a sun shade therefor, and that heretofore separate filters and mounting mechanism therefor have been necessary for each of the lens barrel assemblies. Various mounting means have been utilized for such filters, but heretofore there has been provided no single filter and sun shade readily adapted for use optionally with any of the lens barrel assemblies of the turret head camera, adapted to be mounted directly on the turret head, and readily adjustable for use in any position of adjustment of the turret head. The present invention obviates and overcomes this difficulty by the provision of an improved readily adjustable support for a filter which may be readily adapted for use with any lens barrel assembly with a minimum of effort and difficulty.

The support of the instant invention includes a slide rod generally indicated at 35, and comprised of two separable sections 36 and 37, of different lengths, the purpose of which will be pointed out hereinafter. Section 37 includes at one end of a frusto-conical portion 38 terminating in a threaded member 39 of a diameter and so threaded that it is adapted to engage in the threaded recess 30, the frusto-conical portion 38 seating in a corresponding tapered recess in the plate 22. The opposite end of the member 37 is provided with a tapered recess 40, and a threaded bore 41, adapted for the accommodation of a frusto-conical portion 42 of member 36, for example, and a corresponding threaded portion 43 extending therefrom. Member 36 is provided at its opposite extremity with a tapered recess 44 similar to the recess 40; and a threaded bore 45 corresponding to the bore 41. Flats 46 and 47 are provided on members 36 and 37 respectively, and permit the parts to be engaged and rotated by a wrench if necessary. A cap screw is provided for the assembly, and as best shown in Figure 10 includes a convex head 50 provided with a slot 51, a frusto-conical portion 52 adapted to seat in either recess 44 or 40 in accordance with the relative positioning of the parts, and a threaded projecting portion 53 correspondingly adapted to engage in any of the threaded bores 26, 41 or 45.

The slide rod 35 is adapted to have slidably positioned thereon a filter support, which includes a collar 55 having a bore of a diameter to slide along the rod 35, but establishing sufficient frictional engagement therewith to preclude slippage unless intentionally moved. The collar 55 is preferably integral with a connecting portion 56 and a ring portion 57, the latter having a central aperture 58 (see Figure 7) of substantially the diameter of any one of the lens barrel assemblies. An internally formed shoulder 59 is adapted to serve as a seat for a filter 60, the filter being held in position by the male threaded cylindrical portion 61 of a frusto-conical sun shade member 62. The threads of portion 61 are adapted to engage corresponding female threads 63 cut into the ring member 57.

From the foregoing the operation of the device should now be readily understandable. When it is desired to utilize the long lens barrel assembly 23 the parts are adjusted as shown in Figure 2, member 37 being engaged in threaded aperture 26, slide rod 35 being threadedly engaged therewith, and the collar 55 positioned adjacent the extremity of slide rod section 36, ring 57 and its associated aperture 58 being suitably aligned with the bore of the lens barrel assembly. It is to be noted that collar 55 is freely rotated on the slide rod assembly 35, and hence may be readily swung out of the way when not in use. Similarly the parts may be suitably moved longitudinally of the slide rod 35 until the ring 57 is closed juxtaposed with the tip of the barrel 23, thus positioning filter 60 and sun shade 62 for maximum efficiency.

Figure 4 discloses the position of the parts when utilized in conjunction with the short barrel assembly 24. In this arrangement only slide rod section 36 is utilized, the threaded portion 43 thereof being engaged in the aperture 26, and cap screw 50 being threadedly engaged in the aperture 45. By the removal of the section 37 all projecting portions forwardly of the lens barrel assembly are eliminated, thus precluding the possibility of the casting of shadows which might interfere with proper photography.

Figure 5 shows the use of the device in association with the intermediate lens barrel assembly 55. Under these conditions the member 36 is removed and the slide rod 37 positioned in threaded aperture 26, the portion 39 being threadedly engaged therein, and the cap screw 50 being threadedly engaged in the aperture 41.

Obviously when the sun shade and filter are not in use the entire slide rod assembly 35 may be removed, and the cap screw engaged directly in the threaded aperture 26, to serve as a holding screw for the plate of the turret head.

In Figure 11, turret plate 22 has a long sleeve projection 22' to provide adequate bearing surface for its engagement with a pivot pin 57, screw threaded into the camera body 20. The slide rod 37 has an enlargement 37' adapted to fit over the exterior surface of the sleeve projection 22'. The slide will be retained on the projection 22' by a threaded connection 58, threaded at one end in the slide rod and at the other end in the pivot pin 57.

From the foregoing it will now be seen that there is herein provided an improved filter and sun shade assembly for turret head cameras, which accomplishes all the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative and not in a limiting sense.

I claim:

1. In combination, a camera, a turret plate, means for connecting the turret plate to the camera for rotational adjustment comprising a sleeve projection on said turret plate and a pivot pin extending through the sleeve projection and into the camera so that there is a pivot on which the turret plate may be rotated, a filter and sun shade holder including a slide rod having an enlarged sleeve formation thereon adapted to be extended over the sleeve projection of the turret plate, a threaded pin extending from the slide rod and through the sleeve projection thereof and into the end of the pivot pin on which the turret plate is rotated whereby to secure the slide rod to the pivot pin and to the camera body, a filter and sun shade assembly slidably mounted on said slide rod, and means on said slide rod engaging said sleeve projection to retain said turret plate against axial movement with respect to said pivot pin.

2. A filter and sun shade holder for a camera, comprising a body having a turret head holding screw aperture, a turret head rotatable on said body about the axis of said aperture, and long, short, and intermediate lens barrel assemblies carried by said turret head, all of said assemblies being arranged with their optical axes at the same radial distance from said axis of rotation of said turret head; said filter and sun shade holder comprising a slide rod and a filter and sun shade assembly slidably mounted on said rod and laterally offset from the axis thereof, the radial distance between the axis of said rod and the axis of said filter and sun shade assembly being substantially equal to the radial distance of the optical axis of each of said lens barrel assemblies from said axis of said turret head, said rod comprising two separable sections, each comprising a threaded projection at one end and having a threaded aperture at the other, each of said threaded projections being complementary in form to said first-mentioned aperture and receivable optionally within the threaded aperture of the other of said sections or within said first-mentioned aperture to retain said turret head upon said body and to mount the associated section of said slide rod rigidly on said camera in coaxial alignment with said turret head.

3. A filter and sun shade holder for a camera, comprising a body having a turret head holding screw aperture, a turret head rotatable on said body about the axis of said aperture, and long, short, and intermediate lens barrel assemblies carried by said turret head, all of said assemblies being arranged with their optical axes at the same radial distance from said axis of rotation of said turret head; said filter and sun shade holder comprising a slide rod, a filter and sun shade assembly slidably mounted on said rod and laterally offset from the axis thereof, the radial distance between the axis of said rod and the axis of said filter and sun shade assembly being substantially equal to the radial distance of the optical axis of each of said lens barrel assemblies from said axis of said turret head, said rod comprising two separable sections, each comprising a threaded projection at one end and having a threaded aperture at the other, each of said threaded projections being complementary in form to said first-mentioned aperture and receivable optionally within the threaded aperture of the other of said sections or within said first-mentioned aperture to retain said turret head upon said body and to mount the associated section of said slide rod rigidly on said camera in coaxial alignment with said turret head, and a cap screw interchangeably engageable in any of said apertures.

4. A filter and sun shade holder for a camera, comprising a body having a turret head holding screw aperture, a turret head rotatable on said body about the axis of said aperture, and long, short, and intermediate lens barrel assemblies carried by said turret head, all of said assemblies being arranged with their optical axes at the same radial distance from said axis of rotation of said turret head; said filter and sun shade holder comprising a slide rod, a filter and sun shade assembly slidably mounted on said rod and laterally offset from the axis thereof, the radial distance between the axis of said rod and the axis of said filter and sun shade assembly being substantially equal to the radial distance of the optical axis of each of said lens barrel assemblies from said axis of said turret head, said rod comprising two separable sections, each comprising a threaded projection at one end and having a threaded aperture at the other, each of said threaded projections being complementary in form to said first-mentioned aperture and receivable optionally within the threaded aperture of the other of said sections or within said first-mentioned aperture to retain said turret head upon said body and to mount the associated section of said slide rod rigidly on said camera in coaxial alignment with said turret head, and wrench-engaging flats on each of said slide rod sections.

5. A filter and sun shade holder for a camera, comprising a body having a turret head holding screw aperture, a turret head rotatable on said body about the axis of said aperture, and long, short, and intermediate lens barrel assemblies carried by said turret head, all of said assemblies being arranged with their optical axes at the same radial distance from said axis of rotation of said turret head; said filter and sun shade holder comprising a slide rod, a filter and sun shade assembly slidably mounted on said rod and laterally offset from the axis thereof, the radial distance between the axis of said rod and the axis of said filter and sun shade assembly being substantially equal to the radial distance of the optical axis of each of said lens barrel assemblies from said axis of said turret head, said rod comprising two separable sections, each comprising a threaded projection at one end and having a threaded aperture at the other, each of said threaded projections being complementary in form to said first-mentioned aperture to retain said turret head upon said body and to mount the associated section of said slide rod rigidly on said camera in coaxial alignment with said turret head, one of said slide rod sections being of a length slightly in excess of said short lens barrel assembly, the other of said slide rod sections being of a length slightly in excess of said intermediate lens barrel assembly, and the combined length of both of said slide rod sections being slightly in excess of said long lens barrel assembly.

6. In a lens accessory holder for a turret head camera including a body, a turret head rotatable with respect thereto, and long, short, and intermediate lens barrel assemblies carried by said turret head, all of said lens barrel assemblies being arranged on said turret head with their optical axes at the same radial distance from the axis of rotation of said turret head, said camera body having an aperture therein for a turret head holding screw, said accessory holder comprising a slide rod comprising a shank extending through said turret head and rigidly seated within said aperture to mount said turret head on said body for rotary movement with respect thereto, a shoulder on said rod restricting movement of said turret head axially of said rod, and an outer section projecting outwards from said turret head with its axis coinciding with the axis of said turret head's rotary movement, and a lens accessory support slidably mounted on said outer section of said slide rod and offset laterally therefrom, the radial distance between the axis of said accessory support and the axis of said slide rod coinciding with the radial distance between the optical axis of each of said lens barrel assemblies and the axis of rotation of said turret head.

LEO J. SHERRY.

REFERENCES CITED

The following references are of record in the file of this patent:

UNITED STATES PATENTS

| Number | Name | Date |
|---|---|---|
| 1,818,062 | Howell | Aug. 11, 1931 |
| 1,856,432 | Rudolph et al. | May 3, 1932 |
| 1,884,733 | Kindelmann et al. | Oct. 25, 1932 |
| 2,000,090 | Mitchell | May 7, 1935 |

FOREIGN PATENTS

| Number | Country | Date |
|---|---|---|
| 663,366 | Germany | Aug. 4, 1938 |